(12) United States Patent
Zhang et al.

(10) Patent No.: US 11,461,824 B2
(45) Date of Patent: Oct. 4, 2022

(54) SYSTEMS AND METHODS OF PRODUCT RECOMMENDATION AND INTEGRATED LANGUAGE MODELLING

(71) Applicant: salesforce.com, inc., San Francisco, CA (US)

(72) Inventors: Jun Zhang, Cambridge, MA (US); Nicholas Joseph DelTorto, III, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/876,445

(22) Filed: May 18, 2020

(65) Prior Publication Data

US 2021/0358007 A1 Nov. 18, 2021

(51) Int. Cl.
 *G06Q 30/00* (2012.01)
 *G06Q 30/06* (2012.01)
(52) U.S. Cl.
 CPC ..... *G06Q 30/0631* (2013.01); *G06Q 30/0603* (2013.01)
(58) Field of Classification Search
 None
 See application file for complete search history.

(56) References Cited

U.S. PATENT DOCUMENTS

2006/0206517 A1\* 9/2006 Hyder .................... G06Q 30/02
2017/0206581 A1 7/2017 Feierfeil
2018/0232762 A1\* 8/2018 Greene .............. G06Q 30/0255
2019/0019233 A1 1/2019 Bhowmick
2019/0129712 A1 5/2019 Hawrylo
2019/0139092 A1\* 5/2019 Nomula ............. G06Q 30/0255

OTHER PUBLICATIONS

Seetharamu, Vinod Keshav, A Generic Framework for Recommendations Based on User Data Aggregation, 2016 IEEE International Conference on Web Services (ICWS), pp. 617-622 (Year: 2016).\*
International Search Report and Written Opinion for App. No. PCT/US2021/032533, dated Aug. 20, 2021, 12 pages.

\* cited by examiner

*Primary Examiner* — Jeffrey A. Smith
*Assistant Examiner* — Timothy J Kang
(74) *Attorney, Agent, or Firm* — Butzel Long (57) ABSTRACT

Systems and method are provided for tracking actions from one or more users of an electronic product catalog, assigning a first token to each of the tracked actions that are unrelated to product item information, assigning second tokens to the one or more tracked actions which have catalog information or product identity, assigning third tokens to the one or more tracked actions based on at least one category of a page of the electronic product catalog, and assigning fourth tokens to at least one search queries and/or search refinement of the one or more tracked actions. The server may generate a sequence of tokens in one or more vectors for each of the one or more users, may encode profile information for the one or more users as a matrix of vectors, and may determine at least one product recommendation for the one or more users from the electronic catalog.

18 Claims, 9 Drawing Sheets

SYSTEMS AND METHODS OF PRODUCT RECOMMENDATION AND INTEGRATED LANGUAGE MODELLING

BACKGROUND

A typical product recommender deployed on an online retailer web-site works by predicting a rating for a user-item pair based on the history of ratings, which include ratings given by the user or given to the item.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide systems and methods of recommending products of an electronic product catalog of online commercial retailers. Interactions by a user with an electronic product catalog may be tracked. The tracked activities may tokenized, so that there may be sequences of tokens for each user that are translated from the user's activity with an online electronic product catalog. These tokens, which may be referred to as catalog tokens, may include activity tokens, product tokens, and category tokens, and may be encoded into vectors. To make the recommendation personalized, user profile information may be encoded as a matrix of vectors. The user profile information vectors and the vectorized tokens may be used to make recommendations. A language model may be based on the tokens, where some tokens are more frequently associated with each other than others (i.e., the co-occurrence of tokens). The model may be used to predict the next top product items for recommendation.

In contrast, traditional recommendation systems which use Collaborative Filtering (CF), such as Singular Value Decomposition (SVD). Such systems predict a rating for a user-item pair based on the history of ratings (given by the user, and given to the item Most CF algorithms are based on user-item rating matrix where each row represents a user, each column an item. The entries of the matrix are ratings given by users to the items. SVD is a matrix factorization technique that is usually used to reduce the number of features of a data set.

Some traditional recommendation systems use context bandit algorithms. For example, such systems determine which users are similar, and provide recommendations for a particular user based on the selections and/or purchases of similar users. Such system also typically provide a recommendation for a similar item to that which has been viewed or purchased.

Other traditional systems use language processing, such as BERT (Bidirectional Encoder Representations from Transformers), which is a neural network-based technique for natural language processing (NLP) pre-training. BERT is typically used to determine the context of words in searches, and to match search queries with relevant results.

For commercial websites that may include electronic product catalogs, shoppers and/or users may typically browse a few product items and have interactions with the electronic catalog. It is desirable to recommend one or more products of the electronic product catalog that the shoppers are mostly likely to purchase.

Implementations of the disclosed subject matter provide systems and methods that provide improved recommendation performance over the prevailing collaborative filtering, SVD, and related traditional methods described above. The implementations of the disclosed subject matter may map user interaction history and/or user behavior with the electronic product catalog to generate tokens, and the concurrencies of the tokens and/or sequence of tokens may be used to generate vectors. The interaction history and/or behavior may include product interactions, interactions with the catalog, interactions with one or more categories of items, search queries, refined search queries, and the like. The implementations of the disclosed subject matter may vectorize catalog information. Recommendations for one or more items of the electronic product catalog may be generated based on the user interaction vectors and/or the catalog information vectors. The implementations of the disclosed subject matter may provide for more accurate personalized recommendations, which may provide the shoppers with an improved user experience, such that an increased number of items that are recommended by the system are purchased by users. For example, BERT does not allow for personalization of results. The implementations of the disclosed subject matter may also provide online commercial retailers with improved sales and revenue, based on the improved personalized recommendations.

Figure 1:
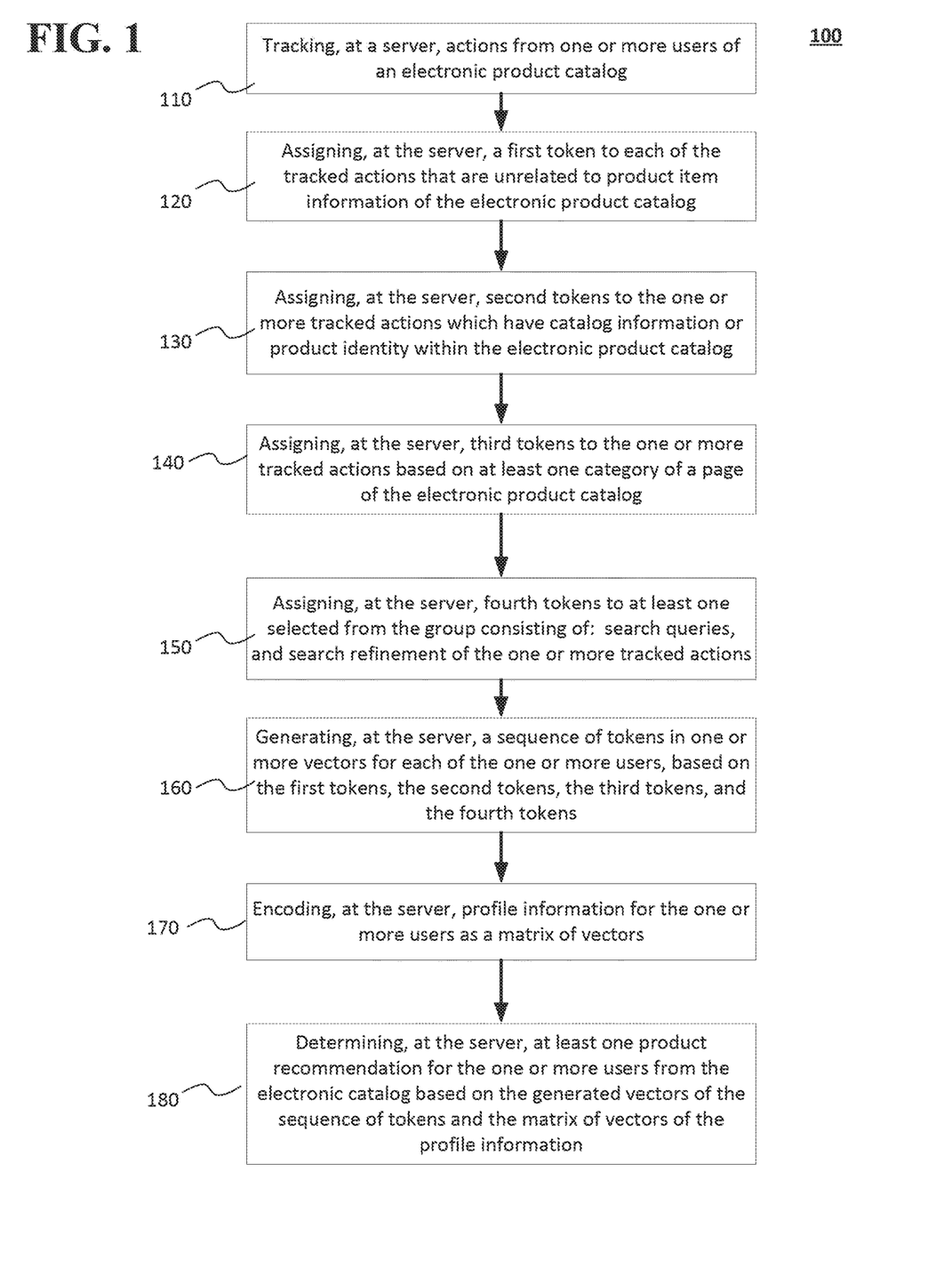
FIGS. 1-2 shows an example method of determining a product recommendation for users from an electronic catalog according to an implementation of the disclosed subject matter.

FIG. 1 shows an example method 100 of determining a product recommendation for users from an electronic catalog according to an implementation of the disclosed subject matter. At operation 110, a server (e.g., central component 600, and/or second computer 700 shown in FIG. 4) may track actions from one or more users of an electronic product catalog. Selections for one or more items in the product catalog may be received by, for example, user input 560 of computer 500 shown in FIG. 4, and may be tracked by the server. The electronic product catalog may be stored on the server and/or a database system (e.g., database systems 1200a-d shown in FIG. 5) communicatively coupled to the server. In some implementations, one or more hash operations may be performed by the server tokenize the tracked interactions with the electronic product catalog and/or online activities.

At operation 120, the server may assign a first token to each of the tracked actions that are unrelated to product item information of the electronic product catalog. The first tokens may be for general and/or high-level activities without product item information. For example, tracked actions without product item information may include actions such as adding an item of the electronic product catalog to an electronic shopping cart (addtoCart), removing an item from the electronic shopping cart (removeFromCart), completing a checkout operation (finishCheckout), viewing a category of items in the electronic product catalog (viewCategory), viewing search results for an item (viewSearch), receiving a selection of a product category of the electronic product catalog (clickCategory), selecting an option to perform a search of the electronic catalog (clickSearch), viewing one or more recommended items (viewReco), receiving a selection of a recommended item (clickReco), receiving registration information from a user (customerSignup), or the like. The first tokens may be generic tokens, which may be assigned by the server as "GT1," "GT2," . . . , "GTk."

At operation 130, the server may assign second tokens to the one or more tracked actions which have catalog information or product identity within the electronic product catalog. For example, activities with specific product item information, such as a selection to view an item of the electronic product catalog (viewProduct_Item), a selection to view a page of the electronic product catalog with an item (viewPage_item), and the like, may be assigned product tokens (second tokens) by the server which have associated catalog information and/or product identity. For example, the second tokens may be product tokens having names such as "PT1," "PT2," . . . , "PTn." In some implementations, the second tokens may comprise the majority of tokens assigned by the server.

At operation 140, the server may assign third tokens to the one or more tracked actions based on at least one category of the electronic product catalog. For example, the server may assign third tokens (category tokens) for category data such as the category of current page, such as "CT1, "CT2," . . . , "CTm." In some implementations, a merchant may have a website with an electronic product catalog, and the third tokens (category tokens) may be based on the categories for the website of the particular merchant. That is, different merchants with websites having their own electronic product catalog may have different categories and different third tokens (category tokens).

At operation 150, the server may assign fourth tokens to search queries and/or search refinement of the one or more tracked actions. For example, for search queries received by the electronic product catalog, the server may assign fourth tokens such as "SQ." In another example, the server may assign fourth tokens such as "SRQ" for the search refinement, where the search terms of an existing search are changed and/or modified.

At operation 160, the server may generate a sequence of tokens in one or more vectors for each of the one or more users, based on the first tokens, the second tokens, the third tokens, and/or the fourth tokens. That is, activities and/or interactions of the one or more of the users with the electronic catalog may be tracked, and a sequence of tokens may be generated for each user that interacts with the electronic catalog.

At operation 170, the server may encode user profile information for the one or more users as a matrix of vectors to make the recommendation personalized. The user profile information may include, for example, age, gender, geographic area, zip code, and the like. If some of the user profile information is unavailable and/or missing, the user profile information may be inferred based on, for example, the user interaction with the electronic product catalog. In some implementations, category variables of the profile information may be encoded by the server using, for example, one-hot encoding. Category variables may be variables that contain label values (e.g., label values of the electronic product catalog) rather than numeric values. One-hot encoding performed by the server may convert categorical variables into a form that may be provided to a machine learning algorithm to improve prediction.

At operation 180, the server may determine at least one product recommendation for the one or more users from the electronic catalog based on the generated vectors of the sequence of tokens and the matrix of vectors of the profile information. The at least one product recommendation may be transmitted from the server to a user's computer, and may be displayed on a device of the user (e.g., display 520 of computer 500 shown in FIG. 4).

Figure 2:
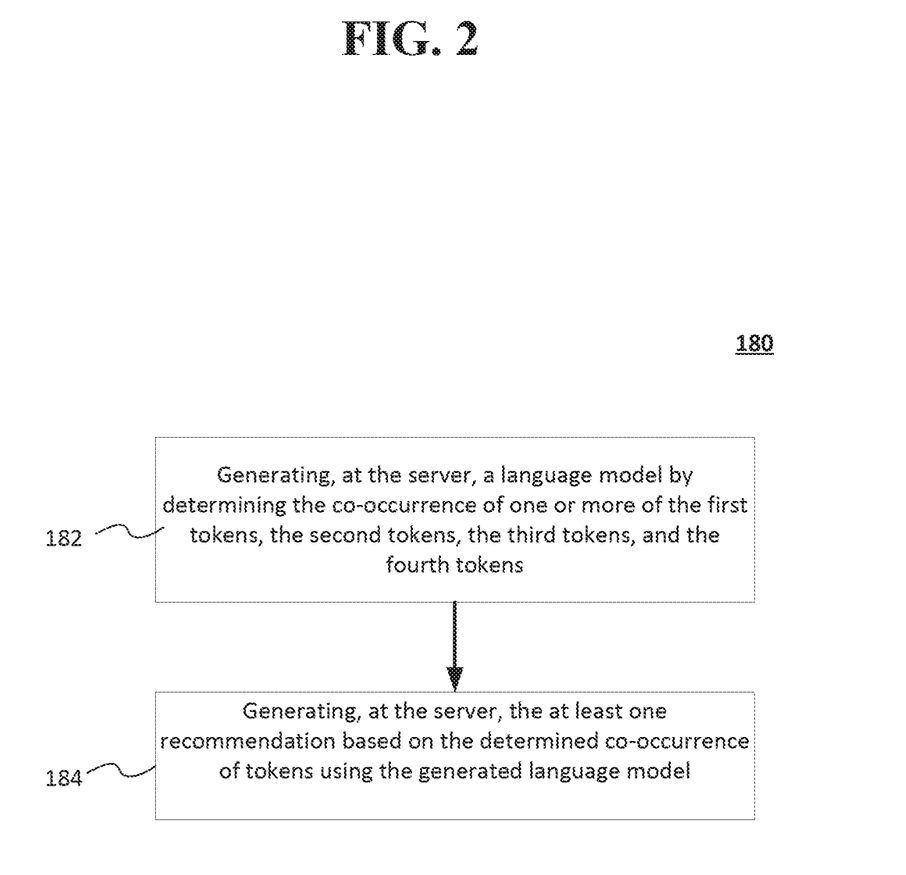

FIG. 2 shows additional operations that may be included in the operation 180 of determining at least one product recommendation according to implementations of the disclosed subject matter. At operation 182, the server may generate a language model by determining the co-occurrence of one or more of the first tokens, the second tokens, the third tokens, and/or the fourth tokens. At operation 184, the server may generate the at least one recommendation based on the determined co-occurrence of tokens using the generated language model. An example using the methods shown in FIGS. 1-2 and which generated recommendations is shown in FIGS. 3A-3E and described below.

Implementations of the disclosed subject matter may have the server build a language model based on the tokens, as some tokens may be more frequently associated with each other than others. That is, the server may build the language model based on the tokens and determine the co-occurrence of the tokens. Sub-models may be generated by the server for each type of toke, and the sub-models may be integrated.

In some implementations, the language model may be generated by the server generating two sub-models for each set of for the second tokens (product tokens) and the third tokens (category tokens). The server may generate a densely connected two-layer sub-model and a softmax outer layer (i.e., final layer). The sub-models generated for the second tokens may be generated by the server applying an embedding layering for vectors formed from the second tokens. An embedding may be a low-dimensional space into which high-dimensional vectors may be translated. Embedding layering may capture semantics of an input by placing semantically similar inputs close together in the embedding space. An embedding may be learned and/or reused across models.

In some implementations, the sub-models may be bidirectional long short-term memory (LSTM) neural networks with attention (e.g., where dependencies between source and target sequences are not restricted by the in-between distance), which may include feedback connections. LSTMs may process single data points, as well as sequences of data. In some implementations, the sub-models may use gated recurrent models, BERT, or the like.

In some implementations, the sub-models may be generated by the server applying an embedding layering for the generated vectors of the sequence of tokens, and the parameters for the sub-models may be tuned during joint training using, for example, a standard Adam (Adaptive Moment Estimation) optimization method. Adam may calculate an exponential moving average of the gradient and the squared gradient, and the parameters (e.g., beta1 and beta2) may control the decay rates of these moving averages. In some implementations, the sub-models may be generated by the server applying an embedding layering to the generated vectors for the first tokens (generic tokens), and/or the generated vectors for the fourth tokens (search tokens). In some implementations, the server may concatenating the vectors of the sub-models to form a super vector. The server may apply dense layers with dropout to the super vector to form a softmax layer for classification to be used for determining the at least one product recommendation. The dropout may be used to prevent a model from overfitting. Using the dense layers with dropout, the server may generate a ranked list of recommendations, and a predetermined number of recommendations (e.g., such as the top five recommendations) may be provided to the user.

In some implementations, vectors and/or sub-models may be concatenated. For example, image data of one or more products of the product catalog may be included in one or more vectors, which may be concatenated with vectors for the text related for the one or more products. In some implementations, ImageNet may be used to form the image vectors. ImageNet is a visual database (e.g., which may be part of database systems $1200a\text{-}d$ shown in FIG. 5), where the images may be annotated to indicate what objects are pictured.

In some implementations, the server may apply a first operation to form a first vector and a second operation to form a second vector. The first vector and the second vector may formed from the second tokens and/or the third tokens. The server may concatenate the first vector and the second vector. In some implementations, the first operation may be a Text-Text Transferring Transformer (T5) operation, and the second operation may be a Word Moving Distance (WMD) operation. That is, for second tokens (i.e., product tokens) and/or third tokens (i.e., category tokens) which may have catalog and/or product description information, two example operations may be used to encode the content into a vector of dimension (dp). The operations may include the transformer based Text-Text Transferring Transformer (T5) and Word Moving Distance (WMD) based encoding. A final representing vector may be the concatenation of the two encoding operations. These vectors may be denoted as "Embeddings_PT_cv_i" where "PT" denotes a product token, "cv" denotes a concatenated vector, and "i" is an index integer for product items. The T5 and WDM operations are merely examples, and the vectors may be generated using other suitable operations.

In some implementations, the server may separately encode all of the first tokens, second tokens, third tokens, and fourth tokens, respectively, for the one or more users into one or more vectors. That is, by using the history data of shopper activities, the tokens may be encoded into vectors. The encoding may be performed by the server using operations such as skip-thought, word2vec, or the like.

Skip-thought may be a neural networks model for machine learning fixed length representations of sentences in a natural language without any labelled data or supervised learning. The supervision and/or training signal that Skip-thoughts may use is the ordering of sentences in a natural language corpus. The Skip-thoughts model may have three parts. The first part may be an encoder network may take a sentence $x(i)$ at index i and may generate a fixed length representation $z(i)$. This may be a recurrent network that takes the words in a sentence sequentially. The second part may be a previous decoder network, which may take the embedding $z(i)$ to generate the sentence $x(i-1)$. This may also be a recurrent network that generates the sentence sequentially. The third part may be a next decoder network, which may take the embedding $z(i)$ to generate the sentence $x(i+1)$. The next decoder network may be a recurrent network similar to the previous decoder network. The end product of skip-thoughts may be an encoder, where the trained encoder may be used to generate fixed length representations of sentences which can be used for several downstream tasks such as sentiment classification, semantic similarity, and the like. The representations of semantically similar sentences may be close to one another.

Word2vec may be a group of related models that are used by the server to produce word embeddings. These models may be neural networks on the server that are trained to reconstruct linguistic contexts of words. Word2vec may receive a corpus of text as input, and may produce a vector space, with each unique word in the corpus being assigned a corresponding vector in the space. Word vectors may be positioned in the vector space by the server such that words that share common contexts in the corpus are located close to one another in the space.

These encoded vectors may be denoted as "token_wv_i", where the "token" portion of the "token_wv_i" may be the original name for the token, such as CT1, ST1, GT1, and the like, the "wv" may indicate "with vector," and "i" may be a number of the vector. In some implementations, the server may encode the fourth tokens into vectors using a Text-Text Transferring Transformer (T5) operation.

Figure 3A:
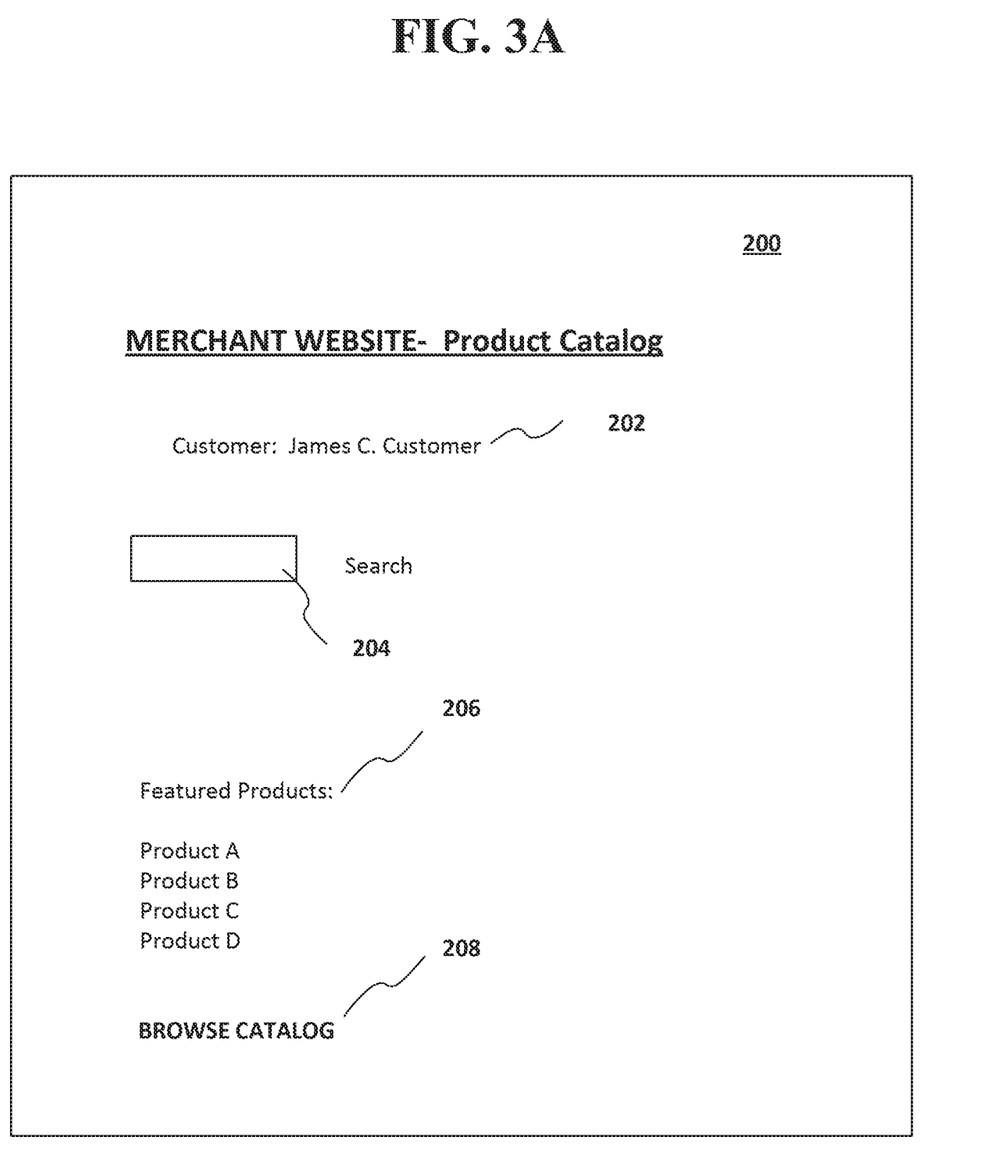
FIGS. 3A-3E show examples of user interactions with a product catalog, generating tokens, and providing product recommendations according to implementations of the disclosed subject matter.

FIGS. 3A-3E show examples of user interactions with a product catalog, generating tokens, and providing product recommendations using the method 100 shown in FIGS. 1-2 and described above according to implementations of the disclosed subject matter. FIG. 3A shows a display 200 that may be displayed on display 520 of computer 500 shown in FIG. 4. The customer name 202 may be displayed on the display 200 (e.g., as "James C. Customer"). In some implementations, a user may browse, search, and/or select products for purchase in the electronic product catalog as a non-returning customer (i.e., a first-time customer) or without entering customer login information.

The customer 202 may enter a search of the product catalog in search dialog box 204, may view featured products 206 (e.g., Product A, Product B, Product C, Product D, or the like), and/or may select browse catalog 208 to view the electronic product catalog of the merchant. In some implementations, the featured products 206 may be recommended products for the customer.

The customer may enter the search terms "running shoe for male" in the search dialog box 204 using the user input 560 of computer 500 (shown in FIG. 4) to search the electronic product catalog for men's running shoes.

Figure 4:
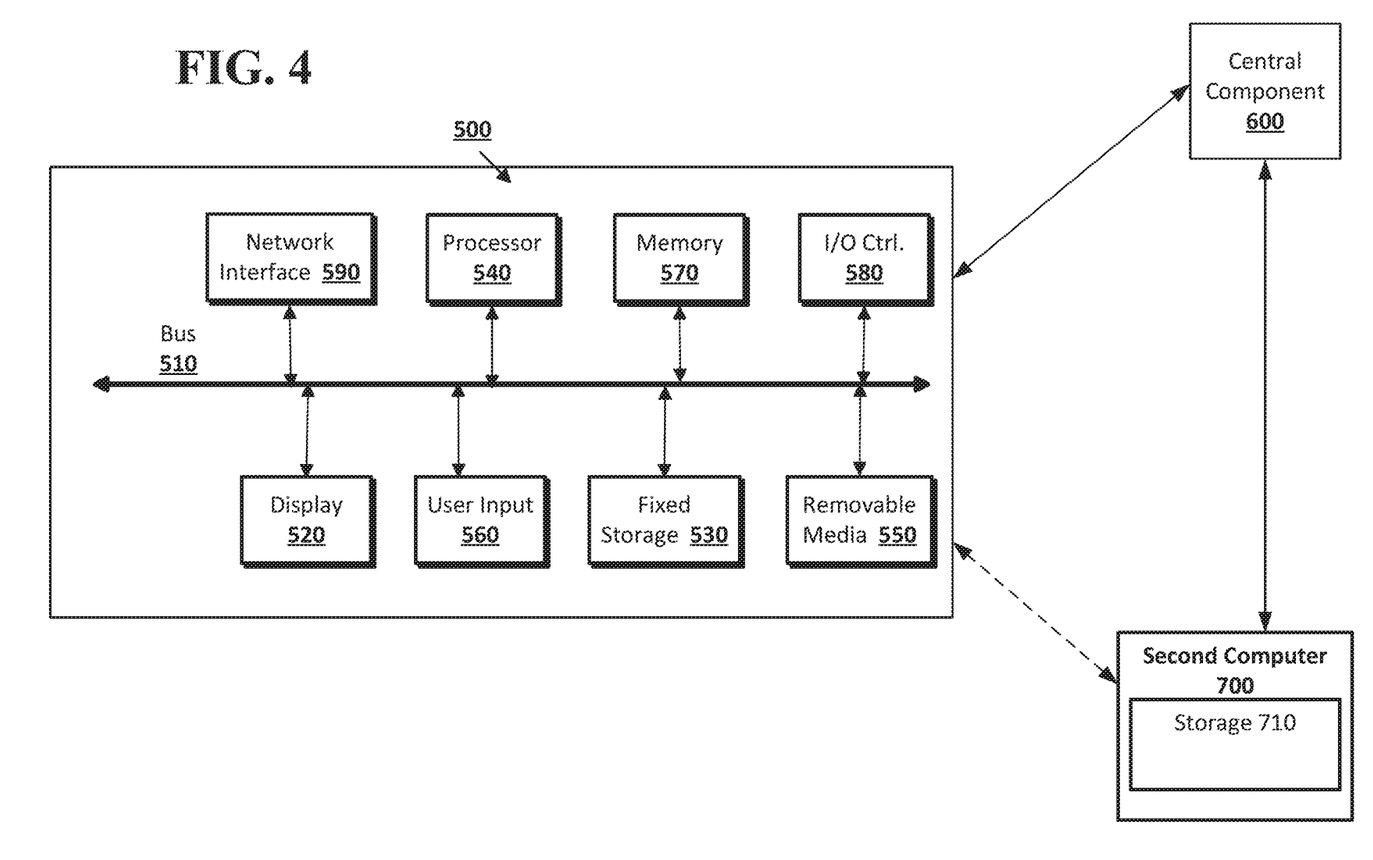
FIG. 4 shows a computer system according to an implementation of the disclosed subject matter.

The server (e.g., central component 600, and/or second computer 700 shown in FIG. 4) may generate a search token (i.e., a fourth token as described above), which may include text content (i.e., "running shoe for male"). The search token may be assigned two types of vectors by the server. A first vector may be inferred by applying a word2vec operation to sequential behavior data (i.e., training data) for all users, which may include co-occurrence patterns of different tokens. The first vector may be denoted by the server as Search_wv, where the "wv" may indicate "with vector." The server may generate a second type vector, where the content may be encoded directly by a neural transformer model T5, where the vector may be denoted as Search_cv (where "cv" indicates that it is a content encoded vector).

Figure 3B:
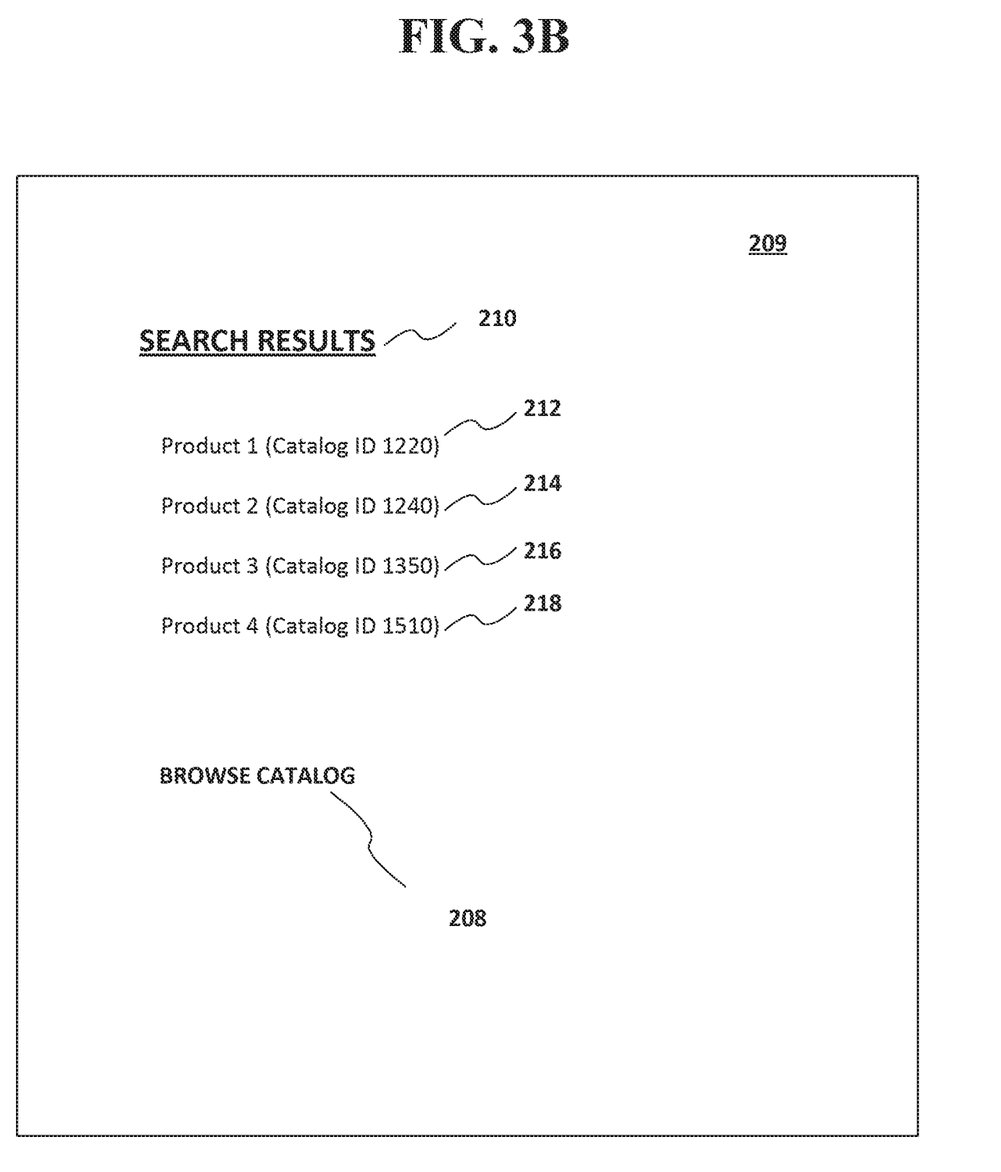

FIG. 3B shows display 209 that may be displayed on display 520 of computer 500 shown in FIG. 4, which may include the search results 210. The search results 210 may include a list of products based on the search query provided in the search dialog box 204 of FIG. 3A. The search results may include product 212 (having catalog identification no. 1220), product 214 (having catalog identification no. 1240), product 216 (having catalog identification no. 1350), and/or product 218 (having catalog identification no. 1510).

The server may generate a token based on the behavior of the customer to view the display 209 that includes the search results. That is, the activity may be identified as "viewSearch," and the server may assign a generic token "ViewSearch" (i.e., a first token as described above). The server may determine the vector for this token based on training data, and the vector may be denoted as "ViewSearch_wv."

Figure 3C:
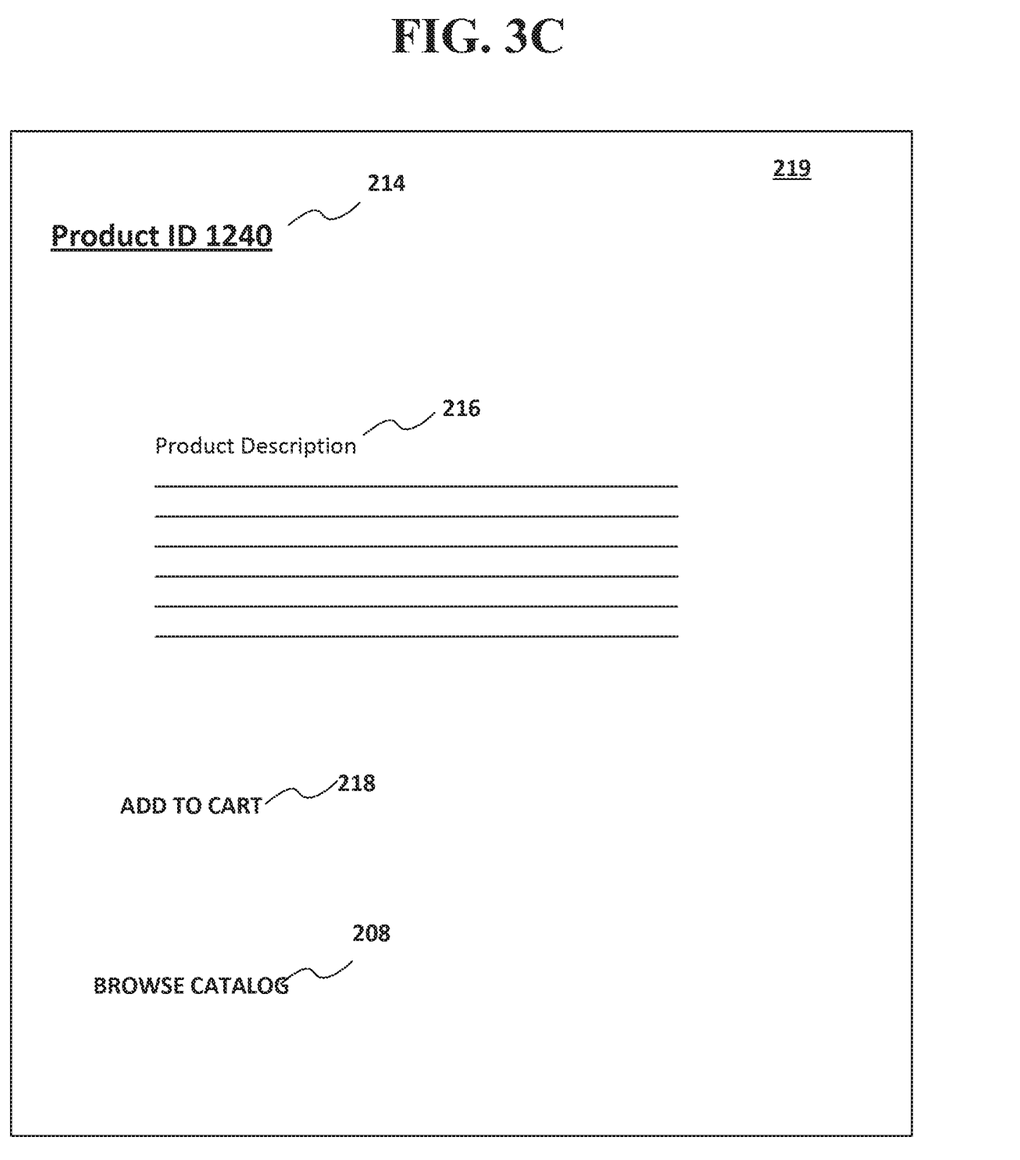

The customer may select product 214 from search results 210 shown in display 209 of FIG. 3B, and display 219 may be displayed as shown in FIG. 3C. Display 219 may include the product 214 and a product description 216 (e.g., which may include a text description and/or an image of the product). The server may generate a product token (i.e., a second token as described above) based on the selection of product 214. The server may indicate that the product token is "PT_wv1240," and the catalog content of the item may be encoded using T5 as another associated vector, denoted as "PT_cv1240." The catalog content may include the product functions, color, size, model, price, manufacturer, and the like.

Figure 3D:
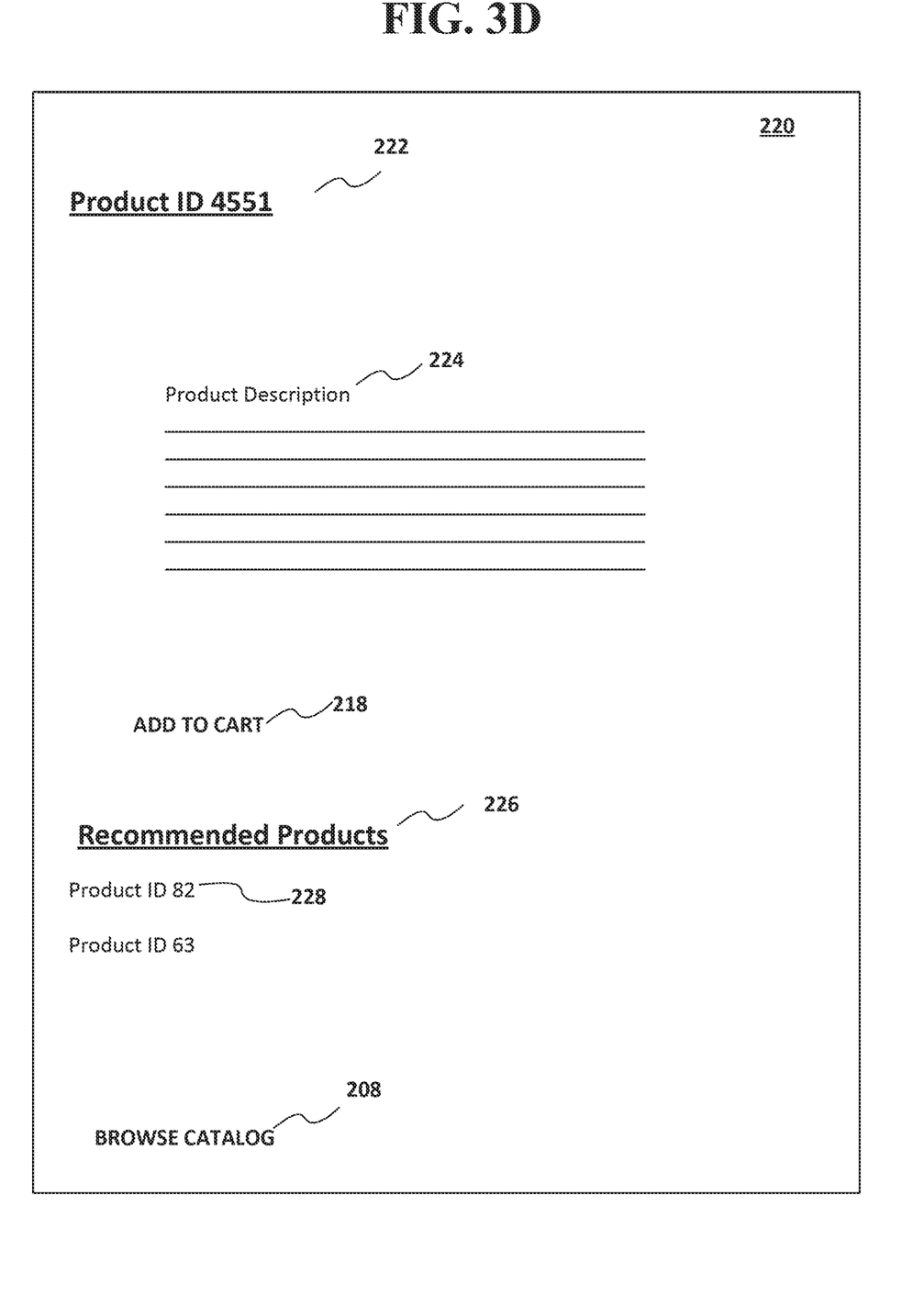
Figure 3E:
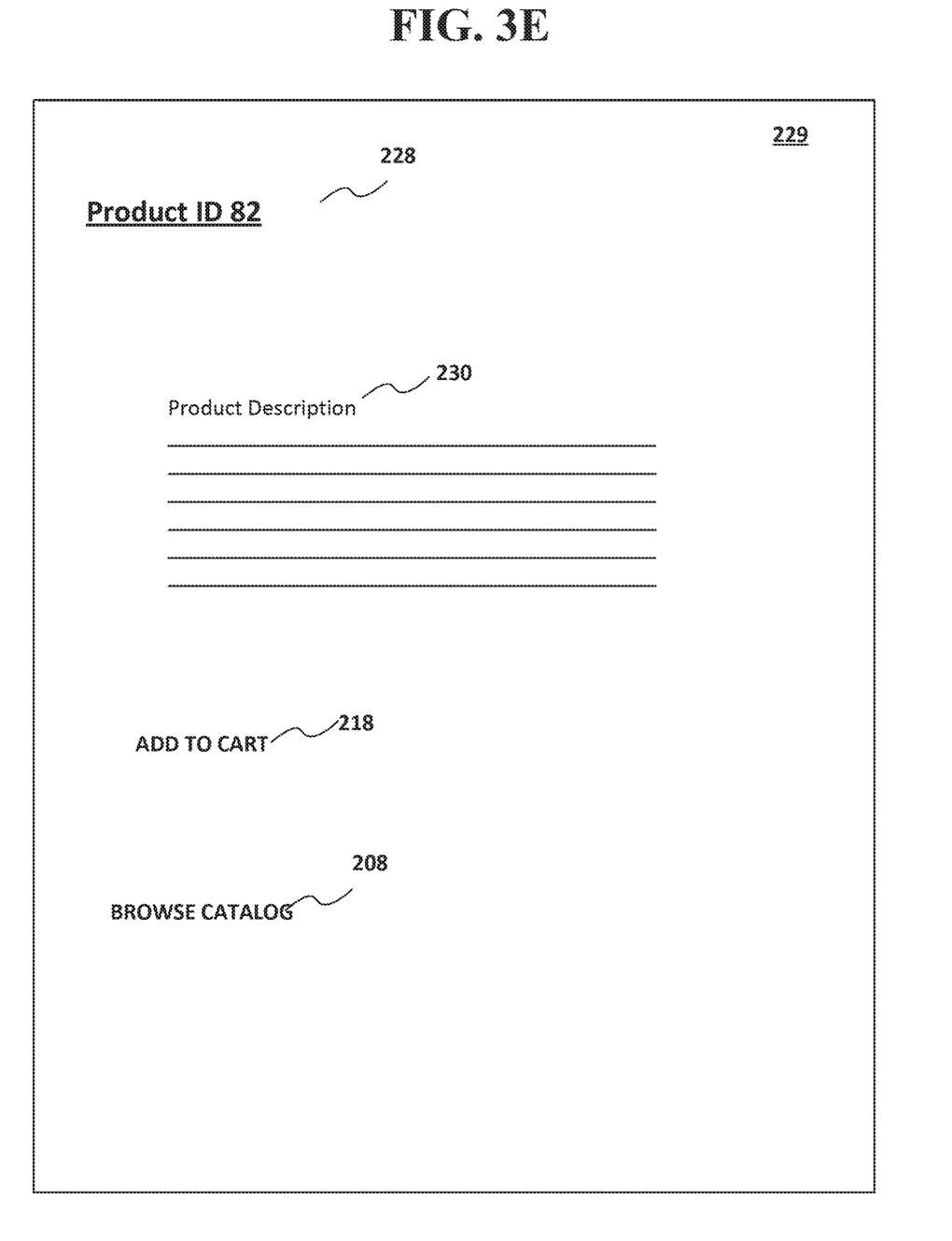

In this example, the user may select browse catalog 208 in display 219, may select a product 222 having a product identifier 4551 in the electronic product catalog, and display 220 may be displayed as shown in FIG. 3D. The server may assign product token (i.e., second token) vectors "PT_wv4551" and "PT_cv4551" for the selected product 222 having product identifier 4551.

The display 220 may include a product description 224 of the product 222, and may provide a selectable option 218 to add the item to an electronic shopping cart. Display 220 may include recommended products 226, which may be similar and/or related to product 222. Recommended products 226 may include product 228 and/or other recommended products.

In some implementations, the recommended product may be generated by the server according to a trained model of machine learning. That is, the server may utilize: (1) the pre-learned shopping patterns of co-occurrence of different product tokens and activity tokens; and (2) the current user sequential behavior to determine one or more items to be recommended. The model may fit the current sequential behavior with the learned patterns.

In this example, the recommended products 226 are shown in display 220 of FIG. 3D, but the server may generate recommended products and display them on displays 200, 209, 219, 220, and/or 229 of FIGS. 3A-3E. For example, when the customer types a search query into search dialog box 204 in FIG. 3A, the server may generate recommendations and provide a list of ranked items in the search results 210 shown in FIG. 3B. That is, the server may use each customer interaction with the electronic product catalog to refine recommendations provided.

The customer may select option 218 to add the product 222 to the electronic shopping cart. The server may generate a generic token (i.e., a first token) based on the selection of option 218, which may be indicated as "GT_puting2cart." The server may generate a single vector based on this token, as there may be no need for a second vector that is based on the customer behavior.

In this example, after adding product 222 to the electronic shopping cart, the customer may select recommended product 228 (i.e., having catalog identification number 82) from the list of recommended products 226 shown in FIG. 3D. Display 229 shown in FIG. 3E may be presented. The server may generate a token "PT_wv82," and may generate the associated catalog content encoded vector "PT_cv82" based on this selection. The display 229 may include product description 230 which may include text description and/or an image of the product 228.

The server may access the user preference vector for the customer (e.g., "James C. Customer"), which may be identified "James_pref." The user preference vector may be stored, for example, at storage 710 shown in FIG. 4 and/or in database systems 1200a-d shown in FIG. 5 if the customer is not a first-time customer. In some implementations, the one or more portions of the user preference vector may be inferred by the server by using information available about the customer. If there is no information available for the customer, the server may use a population mean preference vector instead. The server may align the sequence of tokens and their vectors into the model, and may generate a prediction as to what is the next most likely customer behavior.

Implementations of the presently disclosed subject matter may be implemented in and used with a variety of component and network architectures. FIG. 4 is an example computer 500 suitable for implementing implementations of the presently disclosed subject matter. As discussed in further detail herein, the computer 500 may be a single computer in a network of multiple computers. In some implementations, the computer 500 may be used to request data from one or more services, processing received data, and/or displaying a monitoring report. As shown in FIG. 4, the computer 500 may communicate with a central or distributed component 600 (e.g., server, cloud server, database, cluster, application server, neural network system, or the like). The central component 600 may communicate with one or more other computers such as the second computer 700, which may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof.

Figure 5:
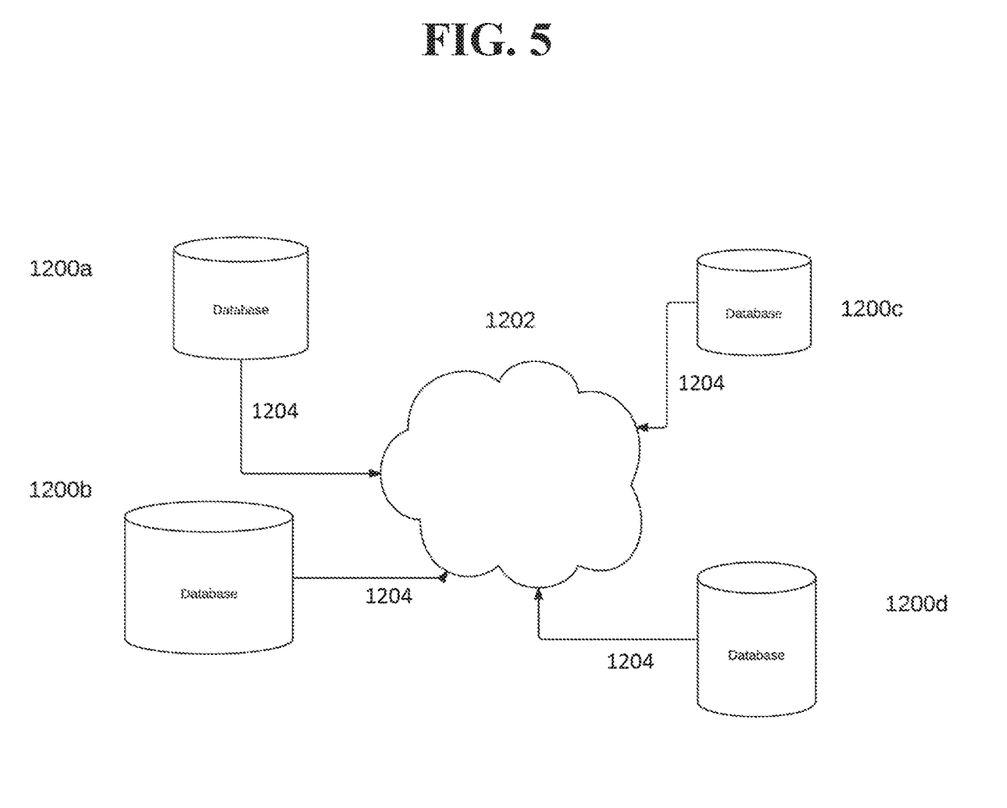
FIG. 5 shows a network configuration according to an implementation of the disclosed subject matter.

The storage 710 of the second computer 700 can store data (e.g., data that is part of the electronic product catalog, generated tokens, generated vectors, tracked activities, or the like). Further, if the systems shown in FIGS. 4-5 are multitenant systems, the storage can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The information obtained to and/or from a central component 600 can be isolated for each computer such that computer 500 cannot share information with central component 600 (e.g., for security and/or testing purposes). Alternatively, or in addition, computer 500 can communicate directly with the second computer 700.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, as shown in FIGS. 4-5.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIGS. 4-5 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

FIG. 5 shows an example network arrangement according to an implementation of the disclosed subject matter. Four separate database systems 1200a-d at different nodes in the network represented by cloud 1202 communicate with each other through networking links 1204 and with users (not shown). The database systems 1200a-d may store, for example, the electronic product catalog, tracked activities, generated tokens, generated vectors, product recommendations, and the like. In some implementations, the one or more of the database systems 1200a-d may be located in different geographic locations. Each of database systems 1200 can be operable to host multiple instances of a database, where each instance is accessible only to users associated with a particular tenant. Each of the database systems can constitute a cluster of computers along with a storage area network (not shown), load balancers and backup servers along with firewalls, other security systems, and authentication systems. Some of the instances at any of database systems 1200a-d may be live or production instances processing and committing transactions received from users and/or developers, and/or from computing elements (not shown) for receiving and providing data for storage in the instances.

One or more of the database systems 1200a-d may include at least one storage device, such as in FIG. 5. For example, the storage can include memory 570, fixed storage 530, removable media 550, and/or a storage device included with the central component 600 and/or the second computer 700. The tenant can have tenant data stored in an immutable storage of the at least one storage device associated with a tenant identifier.

In some implementations, the one or more servers shown in FIGS. 4-5 can store the data (e.g., the electronic product catalog, tracked activities, generated tokens, generated vectors, product recommendations, and the like) in the immutable storage of the at least one storage device (e.g., a storage device associated with central component 600, the second computer 700, and/or the database systems 1200a-1200d) using a log-structured merge tree data structure.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multitenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory.

These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "tracking," "assigning," "generating," "encoding," "determining," "applying," "concatenating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:
1. A method comprising:
tracking, at a server, actions from one or more users of an electronic product catalog and at least one website that are received by the server from a user device and stored in at least one of the server and a database that is communicatively coupled to the server, and performing one or more hash operations on the stored tracked actions to tokenize the tracked actions with the electronic product catalog and website;
determining, at the server, one or more types of the tracked interactions based on the one or more hash operations;
assigning, at the server, a first token to each of the tracked actions that are determined at the server to be unrelated to product item information of the electronic product catalog;
assigning, at the server, second tokens to the one or more tracked actions that are determined at the server to have catalog information or product identity within the electronic product catalog;
assigning, at the server, third tokens to the one or more tracked actions that are determined at the server to have at least one category of a page of the electronic product catalog;
assigning, at the server, fourth tokens to at least one selected from the group consisting of: search queries, and search refinement of the one or more tracked actions;
generating, at the server, a language model based on at least a portion of the first tokens, the second tokens, the third tokens, and the fourth tokens and determining, at the server, a co-occurrence of at least a portion of the first tokens, the second tokens, the third tokens, or the fourth tokens, wherein the generating the language model comprises:
generating two sub-models for each set of for the second tokens and the third tokens; and
applying an embedding layering for vectors formed from the second tokens, wherein the embedding layering captures semantics of an input by placing semantically similar inputs together in an embedding space;
generating, at the server, a sequence of tokens in one or more vectors for each of the one or more users, based on the generated language model and the determined co-occurrence of at least the portion of the first tokens, the second tokens, the third tokens, and the fourth tokens;
encoding, at the server, profile information for the one or more users as a matrix of vectors;

determining, at the server, at least one product recommendation for the one or more users from the electronic catalog based on the generated vectors of the sequence of tokens and the matrix of vectors of the profile information; and transmitting, at the server, the at least one product recommendation to be displayed on the user device.

2. The method of claim 1, further comprising:

applying, at the server, a first operation to form a first vector and a second operation to form a second vector, wherein the first vector and the second vector are formed from at least one selected from the group consisting of: the second tokens, and the third tokens; and concatenating, at the server, the first vector and the second vector.

3. The method of claim 2, wherein the first operation is a Text-Text Transferring Transformer (T5) operation, and the second operation is a Word Moving Distance (WMD) operation.

4. The method of claim 1, further comprising:

separately encoding, at the server, all of the first tokens, second tokens, third tokens, and fourth tokens, respectively, for the one or more users into one or more vectors.

5. The method of claim 4, further comprising:

encoding, at the server, the fourth tokens into vectors using a Text-Text Transferring Transformer (T5) operation.

6. The method of claim 1, wherein the generating the sub-models further comprises applying an embedding layering for the generated vectors of the sequence of tokens, and tuning the vectors.

7. The method of claim 1, wherein the generating the sub-models comprises:

applying, at the server, an embedding layering to at least one selected from the group consisting of: the generated vectors for the first tokens, and the generated vectors for the fourth tokens.

8. The method of claim 1, further comprising:

concatenating, at the server, the vectors of the sub-models to form a super vector.

9. The method of claim 8, further comprising:

applying, at the server, dense layers with dropout to the super vector to form a softmax layer for classification to be used for determining the at least one product recommendation.

10. A system comprising:

a server, including a processor and memory, to:

track actions from one or more users of an electronic product catalog and at least one website that are received by the server from a user device and stored in at least one of the server and a database that is communicatively coupled to the server, and performing one or more hash operations on the stored tracked actions to tokenize the tracked actions with the electronic product catalog and website; determining, at the server, one or more types of the tracked interactions based on the one or more hash operations;

assign a first token to each of the tracked actions that are determined to be unrelated to product item information of the electronic product catalog;

assign second tokens to the one or more tracked actions that are determined to have catalog information or product identity within the electronic product catalog;

assign third tokens to the one or more tracked actions that are determined to have at least one category of a page of the electronic product catalog;

assign fourth tokens to at least one selected from the group consisting of: search queries, and search refinement of the one or more tracked actions;

generate a language model based on at least a portion of the first tokens, the second tokens, the third tokens, or the fourth tokens and determining, at the server, a co-occurrence of at least a portion of the first tokens, the second tokens, the third tokens, and the fourth tokens;

generate a sequence of tokens in one or more vectors for each of the one or more users, based on the generated language model and the determined co-occurrence of the first tokens, the second tokens, the third tokens, and the fourth tokens, wherein the language model is generated by:

generating two sub-models for each set of for the second tokens and the third tokens; and applying an embedding layering for vectors formed from the second tokens, wherein the embedding layering captures semantics of an input by placing semantically similar inputs together in an embedding space;

encode profile information for the one or more users as a matrix of vectors;

determine at least one product recommendation for the one or more users from the electronic catalog based on the generated vectors of the sequence of tokens and the matrix of vectors of the profile information; and transmit the at least one product recommendation to be displayed on the user device.

11. The system of claim 10, wherein the server applies a first operation to form a first vector and a second operation to form a second vector, wherein the first vector and the second vector are formed from at least one selected from the group consisting of: the second tokens, and the third tokens, and wherein the server concatenates the first vector and the second vector.

12. The system of claim 11, wherein the first operation is a Text-Text Transferring Transformer (T5) operation, and the second operation is a Word Moving Distance (WMD) operation.

13. The system of claim 10, wherein the server separately encodes all of the first tokens, second tokens, third tokens, and fourth tokens, respectively, for the one or more users into one or more vectors.

14. The system of claim 13, wherein the server encodes the fourth tokens into vectors using a Text-Text Transferring Transformer (T5) operation.

15. The system of claim 10, wherein the server generates the sub-models by applying an embedding layering for the generated vectors of the sequence of tokens, and tuning the vectors.

16. The system of claim 10, wherein the server generates the sub-models by applying an embedding layering to at least one selected from the group consisting of: the generated vectors for the first tokens, and the generated vectors for the fourth tokens.

17. The system of claim 10, wherein the server concatenates the vectors of the sub-models to form a super vector.

18. The system of claim 17, wherein the server applies dense layers with dropout to the super vector to form a softmax layer for classification to be used for determining the at least one product recommendation.

* * * * *